United States Patent [19]

Cunningham et al.

[11] Patent Number: 5,379,162
[45] Date of Patent: Jan. 3, 1995

[54] CUSTOMIZED DATA RECOVERY PROCEDURES SELECTED RESPONSIVE TO READBACK ERRORS AND TRANSDUCER HEAD AND DISK PARAMETERS

[75] Inventors: Earl A. Cunningham; Bradley E. Hanson, both of Rochester, Minn.

[73] Assignee: International Business Machines Corporation, Armonk, N.Y.

[21] Appl. No.: 109,756

[22] Filed: Aug. 19, 1993

[51] Int. Cl.⁶ .................. G11B 5/09; H03M 13/00
[52] U.S. Cl. .................................... 360/53; 371/41; 371/40.1
[58] Field of Search .............. 360/53, 31, 46, 51, 360/78.08, 77.08; 364/551.01; 371/41, 40.1, 10.2; 369/44.27

[56] References Cited

U.S. PATENT DOCUMENTS

| | | | |
|---|---|---|---|
| 3,668,631 | 6/1972 | Griffith et al. | 371/41 |
| 4,053,752 | 10/1977 | De John et al. | 371/10.2 |
| 4,485,451 | 11/1984 | Dyakov et al. | 364/551.01 |
| 4,516,165 | 5/1985 | Cunningham et al. | 360/53 |
| 4,812,928 | 3/1989 | Krause | 360/53 X |
| 4,821,125 | 4/1989 | Christensen et al. | 360/31 |
| 4,970,609 | 11/1990 | Cunningham et al. | 360/46 X |
| 5,068,858 | 11/1991 | Blaum et al. | 371/41 |
| 5,189,566 | 2/1993 | Christensen et al. | 360/53 |
| 5,233,584 | 8/1993 | Kulakowski et al. | 369/44.27 |
| 5,245,487 | 9/1993 | Cunningham | 360/77.01 |

OTHER PUBLICATIONS

Principles of Digital Audio, Ken C. Pohlmann, 1992 (2nd ed.) Pertinent Pages 221–225.

*Primary Examiner*—Donald Hajec
*Assistant Examiner*—Patrick Wamsley
*Attorney, Agent, or Firm*—Joan Pennington

[57] ABSTRACT

A method and apparatus are provided for data recovery in a disk drive data storage system of the type including at least one disk surface and at least one transducer head for reading and/or writing data to a respective disk surface. A plurality data recovery procedures (DRPs) are stored. When a readback error is detected in a readback data signal, a plurality of predetermined transducer head and disk parameters are identified. One of the stored plurality of data recovery procedures (DRPs) is selected responsive to the detected readback error and the identified plurality of predetermined transducer head and disk parameters.

9 Claims, 5 Drawing Sheets

CUSTOMIZED DATA RECOVERY PROCEDURES SELECTED RESPONSIVE TO READBACK ERRORS AND TRANSDUCER HEAD AND DISK PARAMETERS

BACKGROUND OF THE INVENTION

1. Field of the Invention

The invention relates to a method and apparatus for recovering data when a readback error is detected in a direct access storage device (DASD).

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data are recorded in concentric, radially spaced data information tracks arrayed on the surfaces of the disks. Transducer heads driven in a path toward and away from the drive axis write data to the disks and read data from the disks. Various data recovery procedures (DRPs) are known in the art for use when an error is detected in the readback of data from the disks.

For example, a side erase data recovery procedure (DRP) is disclosed by U.S. Pat. No. 4,516,165 issued May 17, 1985 to E. A. Cunningham and D. C. Palmer and assigned to the present assignee. The disclosed DRP is effective against otherwise hard failures due to head sensitivity to the low frequency content of adjacent tracks, or from adjacent track misregistration (TMR). In the disclosed side erase procedure, data from the adjacent track sectors are read, stored, and then the adjacent track sectors are erased either with the read/write head on the centerline or with the read/write head moved closer to the track of interest. This allows reading sectors of the track of interest that were not recoverable using other normal methods. After a successful read, all data of the track of interest and the adjacent sectors are rewritten.

U.S. Pat. No. 4,821,125 issued Apr. 11, 1989 to Christensen et al. and assigned to the present assignee discloses a data recovery procedure including a variable delta-V. Delta-V is the minimum voltage change per unit time which tests signals to discriminate between data and noise. Re-reads are conducted using various incremented values of delta-V in the recovery sequence.

A typical data recovery procedure includes rereads, head shifts and at least one error correcting code (ECC). Each specific hard disk drive normally has one specified list defining a data recovery procedure (DRP) that is considered best for the disk file. However, within one disk drive product, there can be several different failure mechanisms that are dominant. Since each recovery procedure has a different probability of success for each failure mechanism, one given DRP or recovery list is not optimum for specific cases.

Individual recovery actions are more or less effective given the unique characteristics of each disk file and the specific hardware system and environment of use of the disk file. It is desirable to achieve the fastest recovery possible. This requires the most effective recovery actions to be provided early in the recovery procedure given the sequential nature of data recovery procedures.

SUMMARY OF THE INVENTION

A principal object of the present invention is to provide improved methods and apparatus for data recovery in a disk drive data storage system. Other objects are to provide such improved data recovery methods and apparatus that customize the data recovery procedure (DRP) for known failure mechanisms, on both an individual head disk combination and positional information, and any other information known to affect the recovery, and to provide data recovery methods that overcome many of the disadvantages of prior art arrangements.

In brief, the objects and advantages of the present invention are achieved by a method and apparatus for data recovery in a disk drive data storage system of the type including at least one disk surface and at least one transducer head for reading and/or writing data to a respective disk surface. A plurality of data recovery procedures (DRPs) are stored. When a readback error is detected in a readback data signal, a plurality of predetermined transducer head and disk parameters are identified. One of the stored plurality of data recovery procedures (DRPs) is selected responsive to the detected readback error and the identified plurality of predetermined transducer head and disk parameters.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
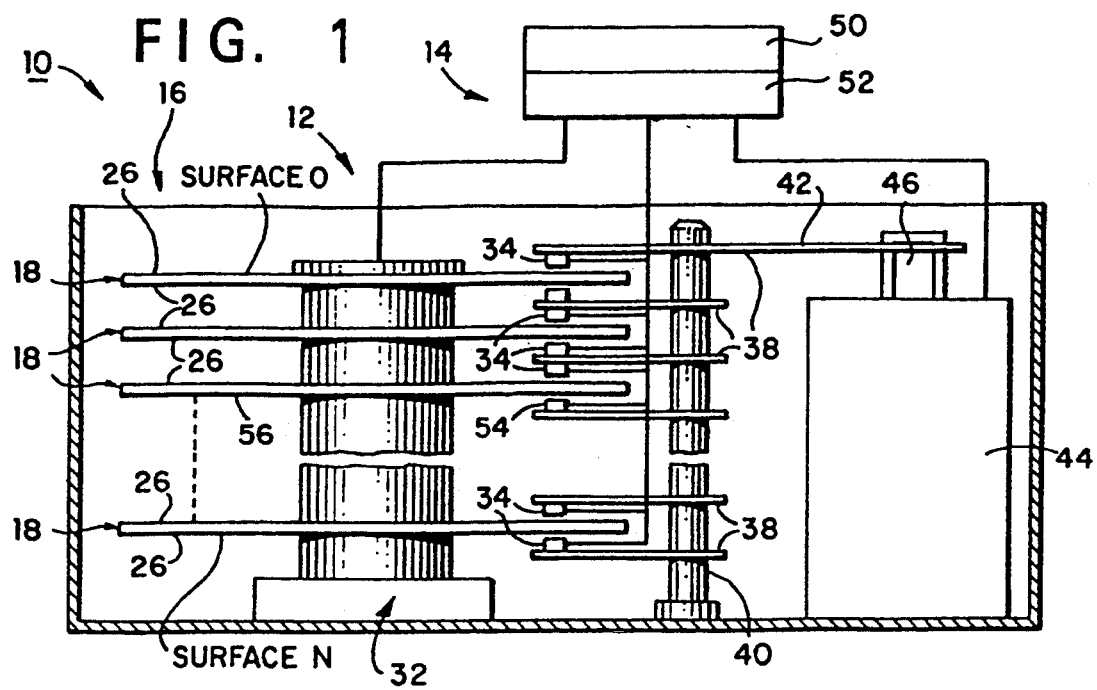
FIG. 1 is a schematic and block diagram of a data storage disk file embodying the present invention.

In FIG. 1 there is shown a partly schematic block diagram of parts of a data storage disk file 10 including a data storage medium generally designated as 12 and an interface control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
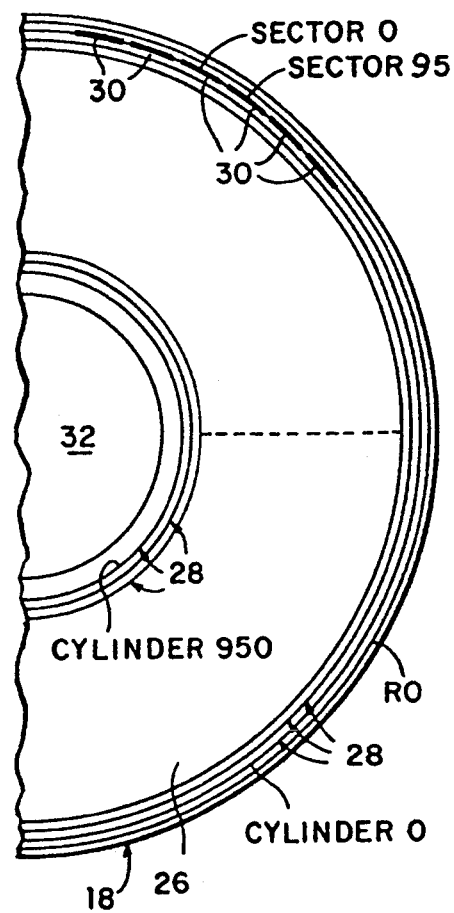
FIG. 2 is a diagram showing tracks and sectors of a data disk surface of the data storage disk file of FIG. 1.

Referring now to FIGS. 1 and 2 of the drawings, disk drive unit 12 includes a stack 16 of disks 18 having magnetic surfaces. Data disks 18 include a layer of magnetic material on opposed disk surfaces 26. Unit 12 includes a selected number of the double-sided data disks 18 to provide a selected storage capacity as indicated in FIG. 1 numbered from SURFACE 0 through SURFACE N. Numerous data information tracks or cylinders 28 are arrayed in a concentric pattern in the magnetic medium of each disk surface 26 of data disks 18. The data information tracks 28 are disposed at predetermined positions relative to servo reference tracks, such as R0 illustrated in FIG. 2. A data cylinder includes a set of corresponding data information tracks 28 for the data SURFACES 0-N. For example, 951 data cylinders can be included in the disk surfaces 26 numbered from 0-950 as indicated in FIG. 2. Each data information track 28 includes multiple data sectors 30 equally spaced around the cylinder; for example, 96 data sectors numbered 0-95.

The disks 18 are mounted in parallel for simultaneous rotation on and by an integrated spindle and motor assembly 32. The data information tracks 28 on each disk 18 are read and/or written to by a corresponding data transducer head 34 movable across the disk surface. Transducer heads 34 are carried by arms 38 that are ganged together for simultaneous pivotal movement about a support spindle 40. One of the arms 38 includes an extension 42 driven in a pivotal motion by a head drive motor 44. Although several drive arrangements are commonly used, the motor 44 can include a coil 46 cooperating with a magnet and core assembly (not seen) operatively controlled for moving the transducer heads 34 in synchronism in a radial direction in order to position the heads in exact registration with the cylinders 28 to be followed.

Data utilization device 14 typically includes an interface or file processor 50 that controls the transfer of data to be stored in the data sectors 30 of disks 18 for subsequent access and use. A servo processor 52 is coupled between the interface processor 50, the motors 32 and 44 and the data transducer heads 34. The servo processor 52 controls the operations of moving the heads 34 into registration with a target or selected data LBA and of transferring data under the control of the interface processor 50.

Disk access is operatively controlled by the servo processor 52. Motor 32 is operated to rotate the disk stack 16. The servo processor 52 employs servo control operations to move the data heads 34 radially with respect to the rotating disks 18 by the head drive motor 44 to selectively align each of the data transducer heads with a specific radial position of the cylinder 28 where data are to be read or written.

In disk file 10, a dedicated servo head 54 located adjacent to a dedicated servo surface 56 for a dedicated servo system advantageously is located in the center of the stack 16. Typically there is no active thermal compensation in the system, so that any thermal effect that tilts the disk pack or the actuator stack causes TMR. However, there is little effect near the servo head, which is the reference, where the feedback maintains the position. The heads 34 that are further away have more thermal offset, generally proportional to the distance from the servo head 54 in the stack 16.

Servo head 54 must properly read when data are being written. A data head 34 is not located in the same slot with the servo head 54, to avoid interference that would result between the heads. In fact, there is some field that penetrates through the disk from the data head that is on the other side of the disk that has the servo head on it. In some cases, this can generate some added TMR when this data head is writing, due to the interference into the servo system.

In accordance with features of the present invention, different failure mechanisms are identified that are specific to the head position in the stack, or radial position, in addition to the characteristics of the head/disk combination. A preferred data recovery procedure is defined specific to the failure mechanisms or risk factors at any given point or head/disk as illustrated and described with respect to FIGS. 3, 4 and 5.

In disk file 10 as with most single band files, the linear density is highest at the inner radius near cylinder 950 than the outer radius near cylinder 0. As a result fly height, gap length and media transition length degrade performance more at the inner radius than the outer radius of the disk surface 26.

When disk file 10 has a relatively low ratio of linear density (BPI) to track density (TPI) and a channel sensitive to low frequency, the longer wavelengths at the outer radius cause a significant interference from side-reading of signals from the adjacent tracks. This can cause the error rate to be higher at the outer tracks than at the inner tracks.

In all drives, there is a tolerance on the track width of the data and servo heads 34 and 54. At the narrower end of the tolerance, a low signal to noise ratio is more likely than with the wider heads. For the wider heads, the side reading is more likely since the adjacent tracks are closer to the edge of the data head. Another aspect of the transducer head failure mechanism is track misregistration (TMR). For the narrower heads, the head will more likely lose more signal with offsets than a wider head. The wider head is more likely to have squeeze from adjacent tracks, where part of the data is erased, and the adjacent track represents an interference where data magnetization once existed. This is more likely to lead to hard errors than the interference on narrow heads.

Figure 3:
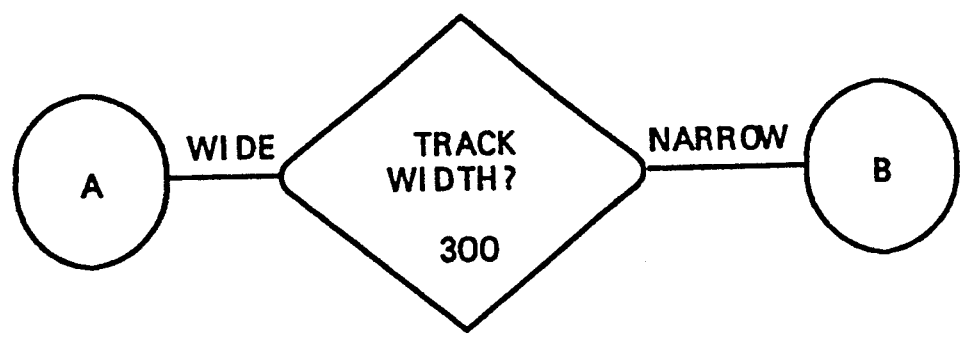
FIGS. 3, 4 and 5 together provide a flow diagram illustrating a data recovery method according to the present invention in the data storage disk file of FIG. 1.
Figure 4:
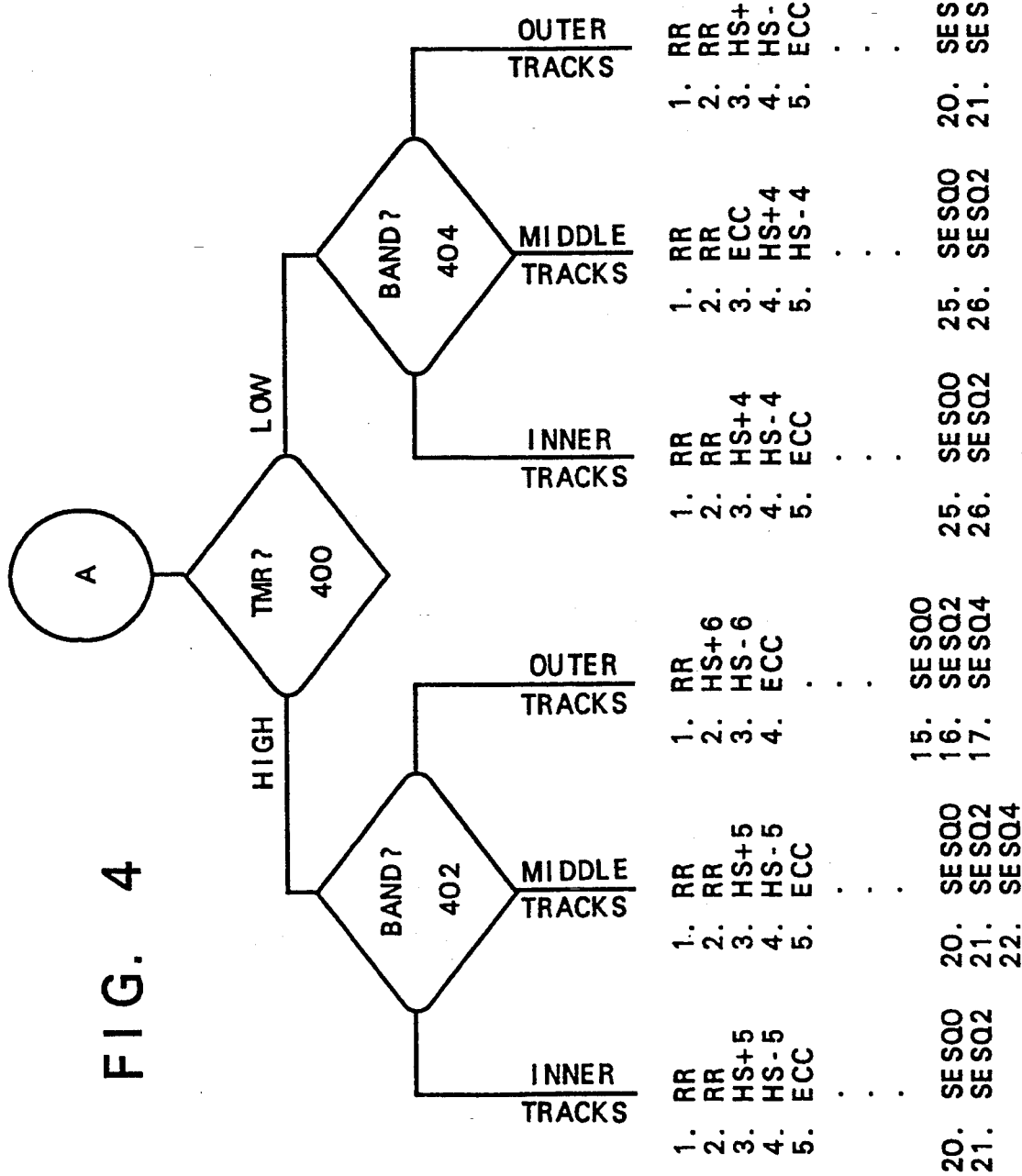
Figure 5:
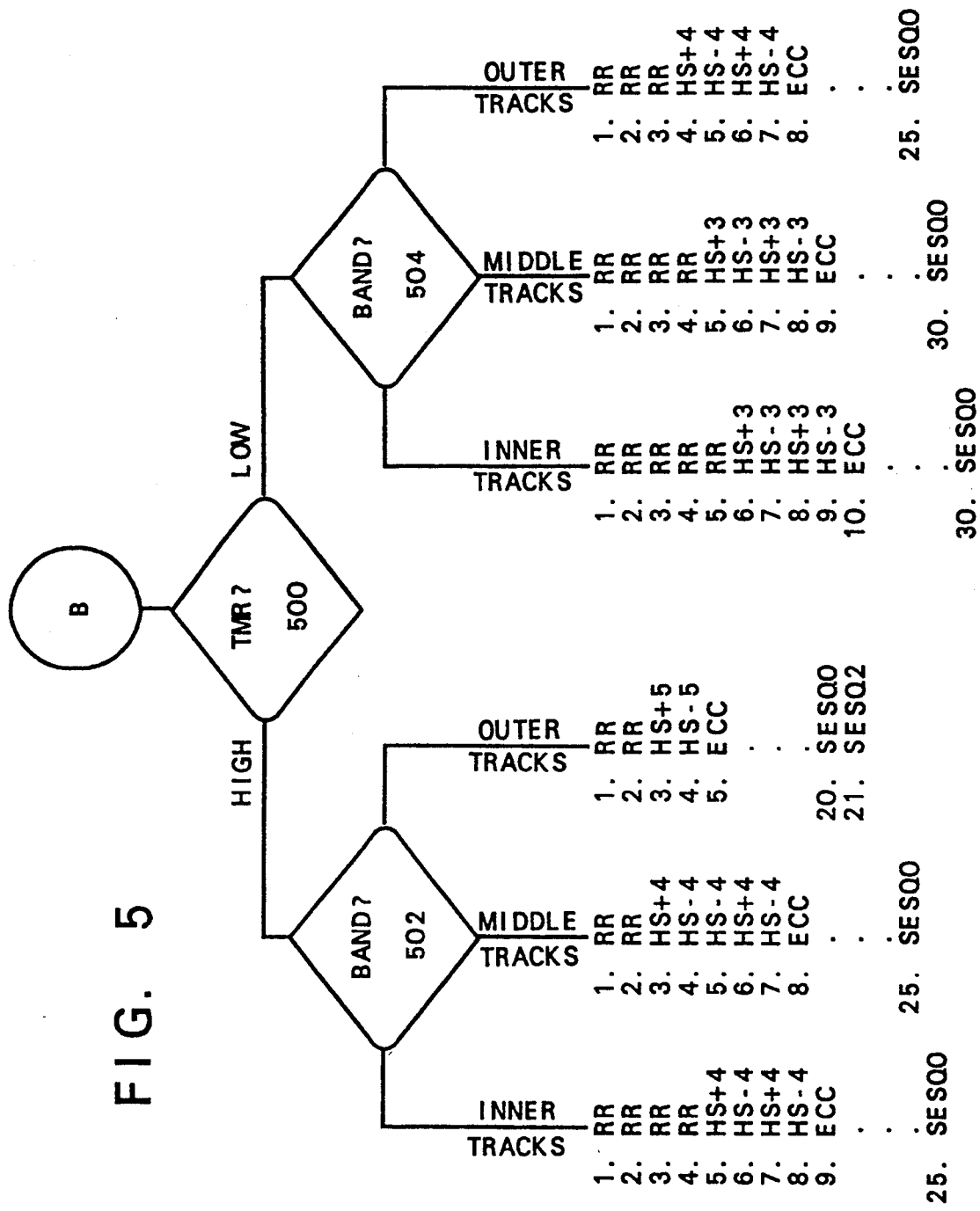

Function tables 1-5 corresponding to FIGS. 3, 4 and 5 provide exemplar appropriate DRP structure given three significant input parameters including:
1. Head width: wide or narrow.
2. TMR: high or low. For example, high TMR can apply to heads at the ends of the disk stack or the head opposite the servo surface. Low TMR cases may apply to heads close to the servo surface but not including the head opposite the servo surface.
3. Radial location across the disk, inner tracks, middle tracks, or outer tracks.

The five output parameters of the function tables are:
1. DRP steps, number of rereads and head shifts.
2. Location of ECC in the procedure.
3. Magnitude of head shift.
4. First step of the procedure to implement side erase.
5. Number of side erase squeeze steps.

Following each function table is a list of rules explaining the logic behind the values in the table. The values provided in the tables are only an example. Specific values used in a particular implementation would be dependent on the details of that application.

Function TABLE 1

| DRP STEPS | INNER TRACKS | MIDDLE TRACKS | OUTER TRACKS |
|---|---|---|---|
| WIDE HEAD | | | |
| HIGH TMR | 2 REREADS 2 HEAD SHIFTS | 2 REREADS 2 HEAD SHIFTS | 1 REREAD 2 HEAD SHIFTS |
| LOW TMR | 2 REREADS 2 HEAD SHIFTS | 2 REREADS 2 HEAD SHIFTS | 2 REREADS 2 HEAD SHIFTS |
| NARROW HEAD | | | |
| HIGH TMR | 4 REREADS 4 HEAD | 3 REREADS 4 HEAD | 2 REREAD 2 HEAD |

Function TABLE 1-continued

| DRP STEPS | INNER TRACKS | MIDDLE TRACKS | OUTER TRACKS |
|---|---|---|---|
| LOW TMR | SHIFTS 5 REREADS 4 HEAD SHIFTS | SHIFTS 4 REREADS 4 HEAD SHIFTS | SHIFTS 3 REREADS 4 HEAD SHIFTS |

Rules
1. If the signal to noise ratio is poorer, then use more rereads.
2. Narrow heads have poorer signal to noise ratios than wider heads.
3. Linear density is higher for the inner tracks.
4. Higher linear density means poorer signal to noise ratio.
5. Rereads are not effective recovering errors due to high TMR.
6. If rereads are not effective then reduce the number of initial rereads.

Function TABLE 2

| ECC LOCATION | INNER TRACKS | MIDDLE TRACKS | OUTER TRACKS |
|---|---|---|---|
| WIDE HEAD | | | |
| HIGH TMR | AFTER HEAD SHIFT | AFTER HEAD SHIFT | AFTER HEAD SHIFT |
| LOW TMR | AFTER HEAD SHIFT | BEFORE HEAD SHIFT | AFTER HEAD SHIFT |
| NARROW HEAD | | | |
| HIGH TMR | AFTER HEAD SHIFT | AFTER HEAD SHIFT | AFTER HEAD SHIFT |
| LOW TMR | AFTER HEAD SHIFT | AFTER HEAD SHIFT | AFTER HEAD SHIFT |

Rules
1. If head has a good electronic signal to noise ratio, errors are most likely from minor defects.
2. ECC is very powerful recovering from minor defects.
3. A good electronic signal to noise ratio with wide head, center tracks, low TMR.

Function TABLE 3

| HEAD SHIFT MAGNITUDE | INNER TRACKS | MIDDLE TRACKS | OUTER TRACKS |
|---|---|---|---|
| WIDE HEAD | | | |
| HIGH TMR | 5 | 5 | 6 |
| LOW TMR | 4 | 4 | 5 |
| NARROW HEAD | | | |
| HIGH TMR | 4 | 4 | 5 |
| LOW TMR | 3 | 3 | 4 |

Rules
1. Heads with good signal ratios to noise are most able to benefit from large head shift values.
2. Heads with low signal to noise ratios should not be exposed to the risk of large head shift values early in the recovery.
3. Narrow heads have poorer signal to noise ratios than wider heads.
4. Linear density is higher for the inner tracks.
5. Higher linear density means a poorer signal to noise ratio .
6. Heads with higher TMR are more likely to benefit from higher head shift values than heads with low TMR.

Function TABLE 4

| SIDE ERASE FIRST STEP | INNER TRACKS | MIDDLE TRACKS | OUTER TRACKS |
|---|---|---|---|
| WIDE HEAD | | | |
| HIGH TMR | 20 | 20 | 15 |
| LOW TMR | 25 | 25 | 20 |
| NARROW HEAD | | | |
| HIGH TMR | 25 | 25 | 20 |
| LOW TMR | 30 | 30 | 25 |

Rules
1. Head susceptible to side reading or track squeeze will most likely benefit from side erase recovery.
2. High TMR causes more track squeeze and side reading exposure than low TMR.
3. Due to reduced bit density, side reading is most predominant at the outer tracks.
4. Wide heads are more susceptible to side reading and squeeze.

Function TABLE 5

| SIDE ERASE SQUEEZE STEPS | INNER TRACKS | MIDDLE TRACKS | OUTER TRACKS |
|---|---|---|---|
| WIDE HEAD | | | |
| HIGH TMR | 1 | 2 | 2 |
| LOW TMR | 1 | 1 | 1 |
| NARROW HEAD | | | |
| HIGH TMR | 0 | 0 | 1 |
| LOW TMR | 0 | 0 | 0 |

Rules
1. Head susceptible to extreme side reading or track squeeze will benefit from side erase recovery with squeezed-in erasure.
2. High TMR causes more track squeeze and side reading exposure than low TMR.
3. Due to reduced bit density, side reading is most predominant at the outer tracks.
4. Wide heads are more susceptible to side reading and squeeze.

Referring now to FIGS. 3, 4 and 5, there is shown a flow chart illustrating sequential data recovery steps performed in accordance with the invention. Referring initially to FIG. 3, the first factor identified is track or head width as indicated at a decision block 300. When a wide track width is identified at block 300, then the sequential steps continue following entry point A in FIG. 4. Otherwise when a narrow track width is identified at block 300, then the sequential steps continue following entry point B in FIG. 5.

Having reference to FIGS. 4 and 5, the sequential operations begin with an identification of high or low TMR as indicated at a respective decision block 400 and 500. When high TMR is identified, then a radial location across the disk surface 26 is identified as indicated at respective decision blocks 402 and 502. Otherwise when low TMR is identified, then a radial location across the disk surface 26 is identified as indicated at respective decision blocks 404 and 504. A corresponding DRP is performed for the radial location identified at blocks 402, 404, 502, 504.

In each of the DRP's illustrated in FIGS. 4 and 5, the first and second steps are reread (RR). Typically the first and most basic type of recovery procedure is the reread. A reread is a repeat of the original read, with no change of parameters. The reread is effective for things that are non-repeatable, such as, for example, random electronic noise that will not be the same on the next revolution. The non-repeatable TMR on the read may have degraded the error rate to an extreme value during the original read, which in combination with noise or other detractors, contributed to an error. Thus the reread has some benefit for moderate TMR in the read. Note that TMR that occurred in the write process gets "write locked" into the written pattern, so it is therefore repeatable, even if the original source during the write was non-repeatable. Thus the TMR from the write does not change on rereads, so the reread only has a moderate effectiveness when TMR is the dominant portion of the degradation that caused a read error. The number of rereads provided before another type of recovery procedure is tried depends on the possible failure mechanisms. In general, the poorer the signal-to-noise ratio, the more likely that errors are due to random noise. The two main factors contributing to a low S/N are that the read width of the head is narrow, and that the linear density is high. We know where the linear density is highest, which is at the inner radius of a drive, especially if the file does not use multiple data rate recording bands.

Next in the illustrated DRPs except for the DRP used when the middle tracks are identified at decision block 404, a common recovery procedure of a head shift is performed, in which the head is moved off the nominal position by some amount in one direction, and a reread is then done. A properly designed system will have equal probability of being off track in either direction. Thus the selection of the direction to move on the first trial is arbitrary. The head shift is probably fairly effective, if there was a failure due to TMR, and if the head was shifted the correct way. If it was shifted the wrong way, there will normally be ZERO odds of recovery. The head is then shifted in the opposite direction to attempt a read. Other amounts of head shift can then also be tried. These different amounts do not necessarily have to occur at the same point in the recovery procedure. In many of our procedures, the amount of the first head shift is normally made significant enough to read for most TMR induced errors. If reads with this offset do not recover the data, then the probability of the error coming from TMR is less likely, and that it was caused by another mechanism is more likely. Thus other procedures may be added after the first head shift. If the data are still not recovered later, then head shifts of larger and smaller amounts may then be tried, since these could be from poor intrinsic error rates at for a "damaged" data section, and it may be necessary to fine tune the head position to find the very best place, in order to read the data.

When the middle tracks are identified at decision block 404, an error correction code (ECC) is used to correct data before a head shift is provided in the DRP. ECC is very powerful for imperfections that are spatially very small. In this case, the nominal data that are read back may have values that are totally wrong, with no odds of being read correctly by normal rereads or head shifts, and it can still be corrected using ECC. The correction can occur if the error burst is less than the correction span of the ECC code. Thus ECC can correct data with failures for which other recoveries have no benefit. In other cases, such as with high TMR, there are many errors in the data over many bytes, so that ECC has no benefit. However, the head shift may easily recover these.

Next the side erase procedure reads the data from the adjacent track sectors, stores the data, then erases these sectors, first in the ontrack position. As with the ECC, this procedure can recover data that no other process can alone. The point is that many recovery procedures have been developed to correct for specific failure mechanisms, and some other recovery procedures may not have any recovery advantage for the given recovery procedure. For a narrow head, near the inner track, and near the servo head, where there are low odds of side reading or heavy squeeze, the side erase is put fairly far down on the DRP list. For a wide head, near the outer track and near the servo head, the side erase is provided sooner, due to increased odds of having side reading. For the same head located far from the servo head, the side erase procedure is moved further up in the list.

The given examples of portions of DRP lists illustrate the operation of such a customized list. Typically the DRP lists for disk file 10 are table driven, which means that each recovery operation is coded like a subroutine in a software problem. The listing in the TABLE then tells which operation to do first, second, third, etc., and how many times each operation should be repeated. In addition, normally a major loop is defined for looping through the list multiple times with the full power of ECC turned on, in the later loops. The later portions rarely are required, but are important in obtaining a very low hard error rate. For data throughput, the first 10 to 20 steps are the most important. The object is to get the data recovered in the fewest operations, since each operation generally means an additional revolution.

| Example Partial Customized DRP Lists | |
| --- | --- |
| Narrow Head Near ID Near Servo | Wide Head Near Center Band Near Servo |
| 1 RR | 1 RR |
| 2 RR | 2 RR |
| 3 RR | 3 ECC |
| 4 RR | 4 HS +4 |
| 5 RR | 5 HS −4 |
| 6 HS +3 | — |
| 7 HS −3 | — |
| 8 HS +3 | — |
| 9 HS −3 | — |
| 10 ECC | — |
| — | — |
| — | 25 Side Erase (on-track) |
| 30 Side Erase (on-track) | Side Erase (squeeze 2) |
| Narrow Head Near OD Near Servo | Wide Head Near OD Hi/Lo on Stack |
| 1 RR | 1 RR |
| 2 RR | 2 HS +6 |
| 3 HS +5 | 3 HS −6 |
| 4 HS −5 | 4 ECC |
| 5 ECC | — |
| — | — |
| — | — |
| — | 15 Side Erase (on-track) |
| 20 Side Erase (on-track) Side Erase | Side Erase (squeeze 2) Side Erase |

-continued

Example Partial Customized DRP Lists

| (squeeze 2) | (squeeze 4) |
| --- | --- |

RR = REREAD;
HS = HEADSHIFT,
+ = shift radially out by 3, 4, 5 or 6 units
− = shift radially in by 3, 4, 5 or 6 units
Side Erase:
on-track = no offset,
squeeze 2, 4 = 2, 4 units inward erase Other steps not listed include other recovery procedures, for example such as variation of other parameters. With peak detection, these include delta V changes, or write state changes, other ECC in combination with other recovery procedures. In brief summary, the data recovery procedure is customized for specific head/disk/radius/characteristics and avoids wasting time performing recovery operations that have almost no odds of producing a recovery.

Figure 6:
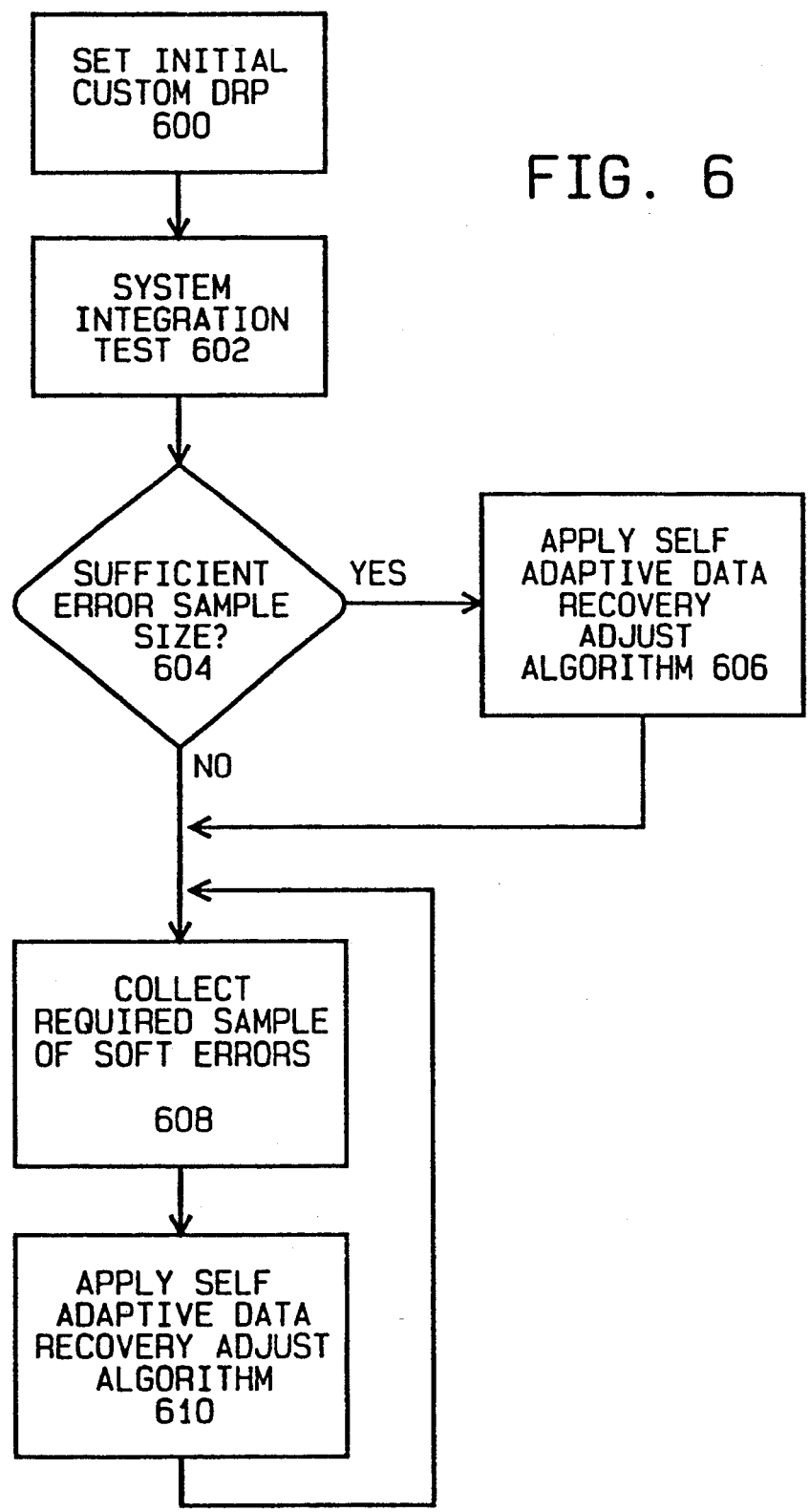
FIG. 6 is a flow diagram illustrating an adaptive modification method of the data recovery procedure of the invention.

Referring to FIG. 6, the sequential steps of a self adaptive data recovery procedure are illustrated. The self adaptive data recovery procedure provides the most effective data recovery procedure for each individual device in its unique environment.

Self adaptive recovery is accomplished by monitoring the effectiveness of the recovery procedure while the device 10 is operating and periodically adjusting the sequence of recovery actions, moving the most effective recovery actions up in the recovery sequence. Self adaptive data recovery could be most active and make the most changes to the recovery procedure during three situations of system integration, initial end customer usage and usage change.

First an initial custom DRP is set as indicated at a block 600. After the device leaves the drive manufacturer the system manufacturer tests the drive as part of the total system before it is shipped to the final using customer during a system integration test as indicated at a block labelled 602. Self adaptive data recovery, when invoked during the system integration test, adjusts the custom DRP to any unique characteristics present within the system it has been placed.

Some minimal number of errors would have to be collected to merit invoking the adjustment algorithm as indicated at a decision block 604. When as indicated at a block 606, the self adaptive data recovery is applied during the system integration test, the duration of the test would be an appropriate sample period.

During the initial period of use by the end user of the system, self adaptive data recovery adjusts the data recovery sequence to optimize recovery to any environmental effects present at the specific location of use.

If the environment or usage pattern of the system changes, or the drive is moved to a new system, self adaptive data recovery would make the appropriate changes to the recovery sequence, providing the most optimum recovery procedure.

The self adaptive data recovery adjustment algorithm is periodically applied during the device's use. The period between adjustments would most likely be once a predetermined number of errors have occurred as indicated at a block 608. The use of error counts to invoke the self adaptive algorithm has some inherent advantage. A statistical sample of errors needs to be established to insure the algorithm is adjusting to a real change and not just noise or short term changes. When the frequency of applying the self adaptive data recovery algorithm is a set number of errors occurring, the recovery procedure evolves fastest in those cases where it will do the most good. The frequency of errors is a function of the base soft error rate of the device and the level of usage. In cases of infrequent soft errors or a good base soft error rate or very infrequent usage, the self adjustment algorithm would be applied less frequently. Also, in these cases, data recovery is invoked less frequently so that the overall speed of the device is less dependent on the speed of data recovery. In cases of frequent soft errors or a poorer soft error rate or very high usage, the adjustment algorithm would be invoked more often. Also in these cases, recovery is used more often, so that the overall speed of the device is more dependent on the speed of recovery. In the latter case, where adjustment is more frequent, the self adaptive data recovery would provide the most benefit.

The specifics of the self adaptive data recovery adjustment algorithm depend on the actual device design and any implementation constraints. The adjustment algorithm factors in all the available data, applies any appropriate bounds, then makes the appropriate adjustments to the recovery sequence.

The inputs to the algorithm would include: 1. The number of errors recovered by each current recovery step during the last sample period. 2. Any electronic channel measurements available in the drive that could confirm or deny the present of device of external changes. Examples of these channel measurements are changes in soft error rate, fly height, or read signal asymmetry. 3. Any other information available to the device that would indicate a change of environment or operating conditions.

Appropriate bounds are defined and applied. Possible bounds are: 1. A minimal number of plain rereads should be first in the recovery procedure because they are the safest recovery action. 2. Side erase being a time consuming and somewhat risky recovery action should not be moved up to the first part of the recovery procedure. 3. ECC, although very powerful in its extended form, may need to be limited to latter recovery steps due to the increased probability of miss-correct.

What is claimed and desired to be secured by Letters Patent of the United States is:

1. A method of data recovery in a disk drive data storage system of the type including at least one disk surface and at least one transducer head for reading and/or writing data to a respective disk surface, said method comprising the steps of:
   storing a plurality of data recovery procedures (DRPs);
   detecting a readback error in a readback data signal;
   identifying a plurality of predetermined transducer head and disk parameters including the steps of identifying a head width parameters value; and identifying a track misregistration parameter value responsive to said identified head width parameter value; and
   selecting one of said stored plurality of data recovery procedures (DRPs) responsive to said detected readback error and said identified plurality of predetermined transducer head and disk parameters.

2. A method as recited in claim 1 further includes the step of:
   identifying a radial location value across the disk surface responsive to said identified track misregistration parameter value.

3. A method as recited in claim 2 further includes the step of:
- selecting a predefined one of said stored plurality of data recovery procedures (DRP's) responsive to said identified radial location value.

4. A method of data recovery in a disk drive data storage system of the type including at least one disk surface and at least one transducer head for reading and/or writing data to a respective disk surface, said method comprising the steps of:
- storing a plurality of data recovery procedures (DRPs);
- detecting a readback error in a readback data signal;
- identifying a plurality of predetermined transducer head and disk parameters;
- selecting one of said stored plurality of data recovery procedures (DRFs) responsive to said detected readback error and said identified plurality of predetermined transducer head and disk parameters;
- collecting a predefined number of readback errors; and
- performing a self adaptive data recovery adjustment algorithm for updating one of said stored plurality of data recovery procedures (DRPs) responsive to said collected predefined number of readback errors.

5. A method as recited in claim 2 wherein said step of identifying a plurality of predetermined transducer head and disk parameters includes the steps of:
- identifying one of a narrow or a wide track width value;
- identifying responsive to said identified track width value one of a high or a low track misregistration (TMR) value; and
- identifying responsive to said identified TMR value one of an inner, a middle or an outer track radial location value.

6. A method as recited in claim 5 wherein said step of identifying one of a high or a low track misregistration (TMR) value includes the steps of:
- identifying a position of the transducer head providing the readback data signal in an actuator stack; and
- identifying a relative position of the transducer head providing the readback data signal to a servo transducer head.

7. Apparatus for data recovery in a disk drive data storage system of the type including at least one disk surface and at least one transducer head for reading and/or writing data to a respective disk surface, said apparatus comprising:
- means for storing a plurality of data recovery procedures (DRPs);
- means for detecting a readback error in a readback data signal;
- means responsive to said detected readback error for identifying a plurality of predetermined transducer head and disk parameters;
- means for selecting one of said stored plurality of data recovery procedures (DRPs) responsive to said detected readback error and said identified plurality of predetermined transducer head and disk parameters;
- means for collecting a predefined number of readback errors; and
- means responsive to said collected predefined number of readback errors for performing a self adaptive data recovery adjustment algorithm for updating one of said stored plurality of data recovery procedures (DRPs)

8. Apparatus for data recovery in a disk drive data storage system of the type including at least one disk surface and at least one transducer head for reading and/or writing data to a respective disk surface, said apparatus comprising:
- means for storing a plurality of data recovery procedures (DRPs);
- means for detecting a readback error in a readback data signal;
- means responsive to said detected readback error for identifying a plurality of predetermined transducer head and disk parameters including means for identifying each of a narrow or a wide track width value; a high or a low track misregistration (TMR) value; and an inner, a middle or an outer track radial location value; and
- means for selecting one of said stored plurality of data recovery procedures (DRPS) responsive to said detected readback error and said identified plurality of predetermined transducer head and disk parameters.

9. A direct access storage device comprising:
- a housing;
- at least one disk mounted in said housing for rotation about an axis and having at least one disk surface for storing data;
- transducer means mounted for movement across said disk surface for reading and writing data to said disk surface;
- means for storing a plurality of data recovery procedures (DRPs);
- means for detecting a readback error in a readback data signal;
- means responsive to said detected readback error for identifying a plurality of predetermined transducer head and disk parameters;
- means for selecting one of said stored plurality of data recovery procedures (DRP's) responsive to said detected readback error and said identified plurality of predetermined transducer head and disk parameters;
- means for collecting a predefined number of readback errors; and
- means responsive to said collected predefined number of readback errors for performing a self adaptive data recovery adjustment algorithm for updating one of said stored plurality of data recovery procedures (DRPs).

* * * * *